Dec. 17, 1957  A. J. ENSOR  2,816,379
FILING DEVICE
Filed March 1, 1954  3 Sheets-Sheet 1
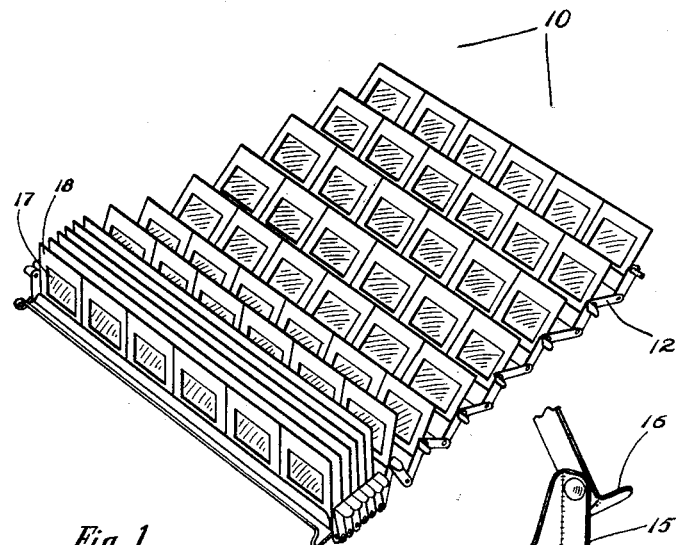
Fig. 1
Fig. 2
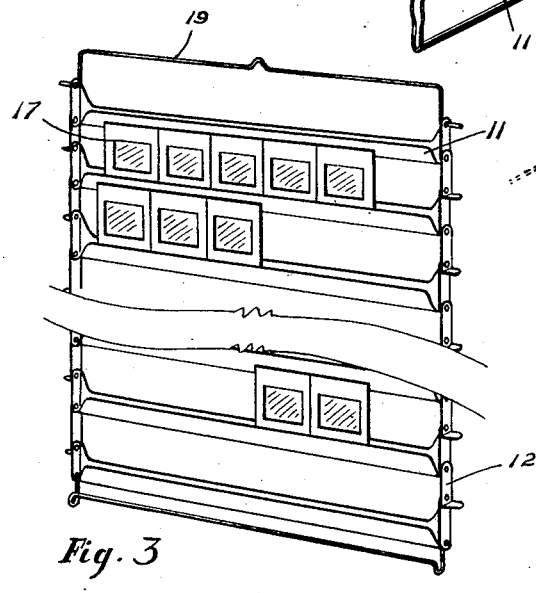
Fig. 3
Inventor
ARTHUR JOHN ENSOR
By- Fetherstonhaugh + Co.
Att'ys Dec. 17, 1957   A. J. ENSOR   2,816,379
FILING DEVICE
Filed March 1, 1954   3 Sheets-Sheet 2
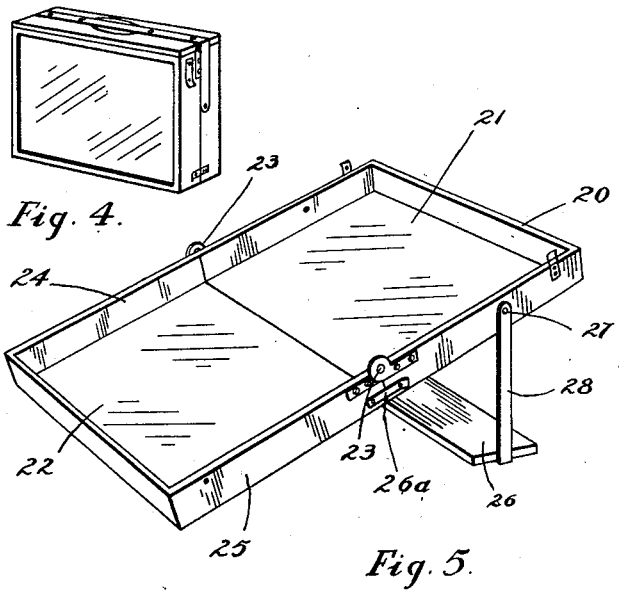
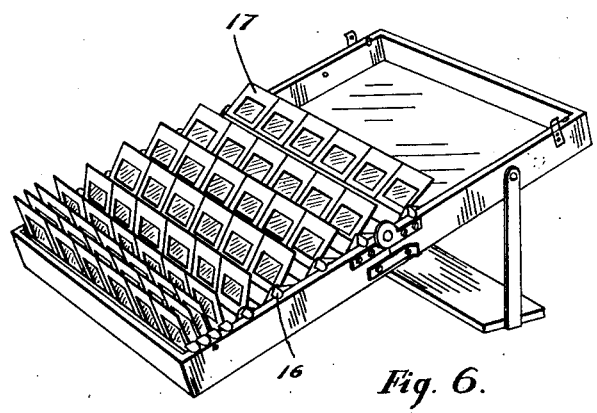
Inventor
ARTHUR JOHN ENSOR
By- Fetherstonhaugh & Co.
Attys Dec. 17, 1957  A. J. ENSOR  2,816,379
FILING DEVICE Filed March 1, 1954  3 Sheets-Sheet 3

Inventor
ARTHUR JOHN ENSOR
By- Fetherstonhaugh & Co.
Attys 2,816,379
Patented Dec. 17, 1957

2,816,379
FILING DEVICE
Arthur John Ensor, Toronto, Ontario, Canada

Application March 1, 1954, Serial No. 413,407

8 Claims. (Cl. 40—130)

This invention relates to a device for storing and displaying slides and the like. More particularly, it is useful for storing and displaying films of the transparency type.

It is an object of the invention to provide a means for storing and displaying film and the like in an efficient manner.

Generally speaking, my invention comprises a series of slide retainers generally trough-like in form interconnected for actuation from an operative or display position to a storage position and vice versa. When the slide retainers are in an operative position there is a light transmitting space between them and they support the slides or the like retained thereby in the light transmitting space so that they can be viewed. When they are actuated to the storage position they are in juxtaposed relation and also support the slides or the like retained thereby in juxtaposed relation.

The invention will be clearly understood after reference to the following detailed specification read in conjunction with the drawings.

In the drawings:

Figure 1 is a perspective view of a device for holding slides, partially actuated from a folded position to a display position.

Figure 2 is a detail of the interconnecting means employed in the device of Figure 1 for connecting the slide retainers.

Figure 3 is a view, broken at its centre, of the slide retaining device of Figure 1 in an operative position.

Figure 4 is a view of a case adapted to hold the slide retaining device of Figure 1.

Figure 5 is a view illustrating the case of Figure 4 in an operative position.

Figure 6 is a view illustrating the case with the slide retaining device partially actuated to an operative position and supported thereby.

Figure 7:
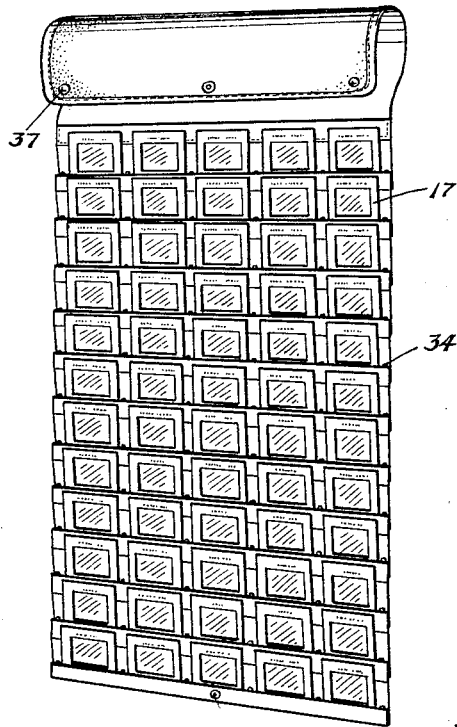
Figure 7 is a view of an alternative embodiment of the invention in an operative position.

Referring to the drawings, and at first to Figures 1 to 6 inclusive, the numeral 10 generally indicates a device for holding slides according to the present invention. It comprises a plurality of slide retaining troughs 11 formed from light metal, plastic, or the like, interconnected by means of links 12 which pivotally connect at their free ends as at 13 and 14 with the flange 15 at the ends of the troughs 11. Lugs 16 preferably project from one end of the links 12 and will be referred to again later.

In use, slides 17 of a transparent nature which are normally held up to light for the purpose of viewing, are inserted into the trough-like slide retainers 11, the side walls of which are spaced apart sufficiently to frictionally retain them in position. The slides, it should perhaps be mentioned, have a rigid mounting frame 18 which is inserted into the trough 11.

The links 12 have a length to space the slide retaining troughs 11 apart a distance such that the transparency portion of the film 17 is supported within the space between interconnected troughs as illustrated in Figure 3.

The pivotal points of connection 13 and 14 of the links 12 with the trough members 11 are spaced apart such that when the slide retaining trough members 11 are folded to assume a juxtaposed position, as indicated in the forward portion of Figure 1, the links 12 will be also in juxtaposed position with their longitudinal axes parallel.

The numeral 19 indicates a bar connected to the top slide retaining member 11 by which the extended slide retaining device as viewed in Figure 3 can be hung up in a vertical position for the purpose of viewing the slides 17 retained therein.

Alternatively, the slides can be viewed in a casing such as the one illustrated in Figure 5. In this case, the casing generally indicated by the numeral 20 has a bottom and a top wall 21 and 22 respectively, made of a light transmitting material, such as plastic or glass. The top and bottom of the casing are hinged together as at 23 so that the top and bottom walls 21 and 22 can be made to lie in a common plane. The slide retaining members 11 have a width such that they will fit between the side walls 24 and 25 of the casing, but that the lugs 16 that extend therefrom will overhang the upper edges of the walls 24 and 25 to support the slide retaining device therein. When it is desired to view the slides, the retainers 11 are extended to make light transmitting spaces therebetween that are occupied by the slides 17. Viewing can be done by merely tilting the slides as illustrated in Figure 6 rather than extending them to assume a common plane as illustrated in Figure 1. Light passing through the translucent bottom and top 21 and 22 of the box gives the user of the device the visual indication he requires of the film. The box can be set up by means of the stand 26 as shown in Figure 5. Spring clips 26a hold the box in the position illustrated in Figure 5.

To store the device or box of Figure 5, the slide retainers are actuated to the folded position, the lugs 16 still overhanging the side edges 24 and 25 of the box. The clip 26a is released and the top 21 is then hinged to overlie the bottom 22 and the end wall 26 is pivoted about the point 27 on the arm 28 to close the space occasioned by the separation of the top and bottom of the box.

More than one slide retaining or slide holding device can be stored in one box when in the folded position. The box in carrying position is illustrated in Figure 4.

In Figures 7 to 11 inclusive, I illustrate a further embodiment of the invention. In that embodiment, the slide retainers are formed by parallel strips 30 and 31 superimposed over a fabric or plastic back 32. A third strip 33 is also superimposed over the fabric back 32 between the strips 30 and 31.

Figure 10:
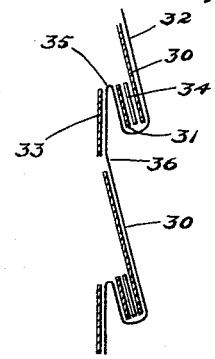
Figure 10 is a cross-sectional view illustrating the construction of the device of Figure 7.

The strips 30 and 31 are maintained facing each other in parallel position as illustrated in Figure 10 by means of spacers generally indicated at 34 in Figure 7.

The fabric 32 must be translucent as also must be the strip 30 and the strip 33. In the case where the transparencies to be stored are mounted in a stiff opaque frame as the transparencies 17 are, and it is the lower edge of such a frame that enters into the trough formed by the strips 31 and 32, it is not necessary that the strip 31 should be of a light transmitting material, although in most cases it will be. A suitable light transmitting material would be film of a plastic nature. It must, of course, have rigidity.

Figure 9:
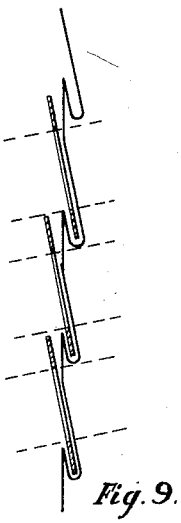
Figure 9 is a schematic illustration of the operation of the device of Figure 7.
Figure 11:
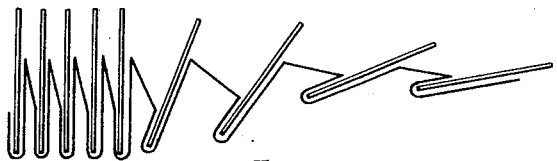
Figure 11 is a schematic illustration showing the manner in which the device of Figure 7 folds from the operative position to the folded position.

The strips 30, 31 and 33 adhered to the fabric backing 32 as described, permit the fabric to hinge about the lines 35 and 36, the said lines being spaced apart such that the slide retaining troughs formed by the strips 31 and 30 can be actuated from an operative position, as schematically illustrated in Figure 9 wherein light is free to pass between the space between adjacent troughs, to a folded position schematically illustrated in Figure 11 wherein the troughs are in a juxtaposed relation.

Figure 8:
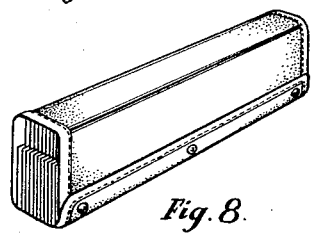
Figure 8 is the slide retaining device of Figure 7 in a folded position.

The fabric backing 32 preferably has a free end provided with buttons 37 that mate with clips on the opposite free end to provide a cover for the folded device, as indicated in Figure 8.

Embodiments of my invention other than the one illustrated will, of course, be apparent to those skilled in the art. For example, the embodiment of Figure 7 could be modified by making it of an integral translucent plastic material having thick rigid areas corresponding to the areas where rigid strips 30, 31 and 33 are disposed, and thinner flexible areas therebetween.

What I claim as my invention is:

1. A device for holding slides and the like comprising: a plurality of slide retainers, connecting means interconnecting said slide retainers and supporting said retainers in an operative position with light transmitting space between them to support slides or the like retained thereby in a viewable position in said light transmitting space, said connecting means being collapsible whereby said retainers can be actuated to a storage position in which said retainers are in juxtaposed relation with respect to each other whereby to support slides retained by adjacent retainers also in a juxtaposed position.

2. A device for holding slides and the like as claimed in claim 1, in which said slide retainers are trough-like.

3. A device for holding slides and the like as claimed in claim 1, in which said slide retainers are trough-like and said connecting means comprise rigid links pivotally connecting at their free ends to adjacent slide retainers.

4. A device for holding slides and the like as claimed in claim 1, in which said slide retainers are trough-like and said connecting means comprise rigid links pivotally connecting at their free ends to adjacent slide retainers at spaced apart points whereby said links are in parallel juxtaposed relation when said retainers are in a storage position.

5. A device for holding slides and the like as claimed in claim 1, in which said slide retainers are trough-like and said connecting means comprise rigid links pivotally connected at their free ends to adjacent slide retainers, said device having means extending laterally thereof for supporting said device on the side of a box or the like.

6. A device for holding slides and the like as claimed in claim 1, in which said slide retainers are trough-like and said connecting means comprise rigid links pivotally connected at their free ends to adjacent slide retainers, said device having lugs extending laterally thereof for supporting said device on the sides of a box or the like, and a box having a width to receive said device and to support said device by means of said projecting lugs.

7. A device for holding slides and the like comprising: a plurality of slide retainers, connecting means interconnecting said slide retainers with a light transmitting space between them to support slides or the like retained thereby in a viewable position in said light transmitting space, said connecting means being swingable about two lines parallel to each other whereby said slide retainers can be actuated to a juxtaposed position to support slides retained by adjacent retainers also in a juxtaposed position.

8. A device for holding slides and the like comprising: a piece of translucent fabric, a plurality of slide retainers formed by two strips of rigid material superimposed on said fabric and disposed in parallel relation to each other to form a channel, third strips of rigid material between said latter two strips also superimposed on said fabric, all of said strips being separated but in close relation to each other whereby said material forms a hinge between them, one of said strips forming said channel being substantially deeper than the other whereby said channels can be folded to lie in substantially juxtaposed position as well as said spaced apart position previously mentioned.

References Cited in the file of this patent

UNITED STATES PATENTS

| | | |
|---|---|---|
| 971,495 | Eacrett | Sept. 27, 1910 |
| 1,655,341 | Snellgrove | Jan. 3, 1928 |
| 2,334,176 | De Sherbinin | Nov. 16, 1943 |